(12) United States Patent
Pollatsek

(10) Patent No.: US 10,697,996 B2
(45) Date of Patent: Jun. 30, 2020

(54) ACCELEROMETER SENSING AND OBJECT CONTROL

(71) Applicant: Nintendo Co., Ltd., Kyoto (JP)

(72) Inventor: David Pollatsek, Minneapolis, MN (US)

(73) Assignee: NINTENDO CO., LTD., Kyoto (JP)

( * ) Notice: Subject to any disclaimer, the term of this patent is extended or adjusted under 35 U.S.C. 154(b) by 1150 days.

(21) Appl. No.: 14/614,181

(22) Filed: Feb. 4, 2015

(65) Prior Publication Data

US 2015/0153381 A1 Jun. 4, 2015

Related U.S. Application Data

(63) Continuation of application No. 11/736,222, filed on Apr. 17, 2007, now abandoned, which is a
(Continued)

(51) Int. Cl.
*G01P 15/18* (2013.01)
*A63F 13/211* (2014.01)
(Continued)

(52) U.S. Cl.
CPC ............. *G01P 15/18* (2013.01); *A63F 13/10* (2013.01); *A63F 13/211* (2014.09); *A63F 13/42* (2014.09); *A63F 13/57* (2014.09); *A63F 13/803* (2014.09); *A63F 13/22* (2014.09); *A63F 2300/105* (2013.01); *A63F 2300/1006* (2013.01); *A63F 2300/6045* (2013.01); *A63F 2300/64* (2013.01); *A63F 2300/643* (2013.01); *A63F 2300/8017* (2013.01)

(58) Field of Classification Search
CPC .......... G06F 13/06; G06F 3/016; A63F 13/06; A63F 13/02; G01C 9/00
USPC ..................... 463/37, 31; 345/458
See application file for complete search history.

(56) References Cited

U.S. PATENT DOCUMENTS 4,738,451 A 4/1988 Logg
5,038,144 A 8/1991 Kaye
(Continued)

FOREIGN PATENT DOCUMENTS

JP 3379702 B2 12/2002

OTHER PUBLICATIONS

Michelle Clifford and Leticia Gomez, Sensor products,Tempe, AZ "Measuring Tilt with Low-g Accelerometers" AN3107; 8 Pages; 2005.*
(Continued)

*Primary Examiner* — Regis J Betsch
*Assistant Examiner* — Kaleria Knox
(74) *Attorney, Agent, or Firm* — Nixon & Vanderhye, P.C.

(57) ABSTRACT

A handheld controller includes a three-axis, linear acceleration sensor that can detect linear acceleration in three directions, i.e., the up/down direction (Y-axis), the left/right direction (Z-axis), and the forward/backward direction (X-axis). A programmed object adjustment process adjusts a falling object to decrease the velocity v at which the object is moving in response to detected tilt changes in a first direction, and to increase the velocity v at which the object is moving in response to detected tilt changes in a second direction different from the first direction.

19 Claims, 11 Drawing Sheets

Related U.S. Application Data continuation-in-part of application No. 11/560,495, filed on Nov. 16, 2006, now abandoned.

(60) Provisional application No. 60/826,950, filed on Sep. 26, 2006.

(51) Int. Cl.
*A63F 13/42* (2014.01)
*A63F 13/803* (2014.01)
*A63F 13/40* (2014.01)
*A63F 13/57* (2014.01)
*A63F 13/22* (2014.01)

(56) References Cited

U.S. PATENT DOCUMENTS

| | | | |
|---|---|---|---|
| 5,059,958 A | 10/1991 | Jacobs et al. | |
| 5,526,022 A | 6/1996 | Donahue et al. | |
| 5,528,265 A | 6/1996 | Harrison | |
| 6,234,901 B1 | 5/2001 | Nagoshi et al. | |
| 6,394,904 B1 | 5/2002 | Stalker | |
| 6,500,069 B1 | 12/2002 | Ohba et al. | |
| 6,597,342 B1 * | 7/2003 | Haruta | A63F 13/06 345/157 |
| 7,145,551 B1 | 12/2006 | Bathiche et al. | |
| 7,445,549 B1 | 11/2008 | Best | |
| 2002/0142836 A1 * | 10/2002 | Nakazato | A63F 13/06 463/33 |
| 2006/0092133 A1 * | 5/2006 | Touma | G06F 3/0346 345/158 |
| 2006/0287089 A1 * | 12/2006 | Addington | A63F 13/06 463/37 |
| 2010/0261526 A1 * | 10/2010 | Anderson | G06F 3/016 463/31 |
| 2010/0295847 A1 | 11/2010 | Titus | |

OTHER PUBLICATIONS http://e./wikipedia.org/wiki/List_of Superman_video_games, printed Feb. 6, 2014, Wikipedia.

* cited by examiner

NON-LIMITING EXAMPLE CONTROLLER

NON-LIMITING EXAMPLE CONTROLLER

ACCELEROMETER SENSING AND OBJECT CONTROL

CROSS-REFERENCE TO RELATED APPLICATIONS

This application is a continuation of U.S. patent application Ser. No. 11/736,222 filed Apr. 17, 2007; which is a continuation-in-part of U.S. patent application Ser. No. 11/560,495 filed Nov. 16, 2006, now abandoned; which claims the benefit of U.S. Provisional Application No. 60/826,950 filed Sep. 26, 2006; all of which are incorporated herein by reference.

TECHNICAL FIELD

The technology herein relates to inertial sensors including accelerometers, and more particularly to accelerometer sensing and control using a hand-held attitude sensor.

BACKGROUND AND SUMMARY

Three-axis or two-axis linear accelerometers are available from Analog Devices, Inc. or STMicroelectronics N.V. Such an acceleration sensor is an electrostatic capacitance or capacitance-coupling type that is based on silicon micro-machined MEMS (micro-electromechanical systems) technology.

A handheld controller includes a three-axis, linear acceleration sensor that can detect linear acceleration in three directions, i.e., the up/down direction (Y-axis), the left/right direction (Z-axis), and the forward/backward direction (X-axis). Alternatively, a two-axis linear accelerometer that only detects linear acceleration along the Y-axis may be used. Generally speaking, the accelerometer arrangement (e.g., three-axis or two-axis) will depend on the type of control signals desired.

The technology herein provides such a hand-held inertial sensor that at least in part controls the in-flight attitude of a moving platform. In one exemplary illustrative non-limiting implementation, a hand-held controller including internal tilt sensors such as accelerometers is used to control the path an object takes through a virtual environment. Two-handed operation of a hand-held controller may be used to simulate a steering wheel or other control input to control the object's path. For example, a user can move both hands together in a counter-clockwise rotational motion to make the controlled object go left. Similarly, when the user's hands both move in a clockwise motion, the object's path may turn to the right. Controller buttons may be used to control acceleration and deceleration of the object.

BRIEF DESCRIPTION OF THE DRAWINGS

These and other features and advantages of exemplary illustrative non-limiting implementations will be better and more completely understood by referring to the following detailed description in conjunction with the drawings of which.

DETAILED DESCRIPTION

Exemplary System

Figure 1:
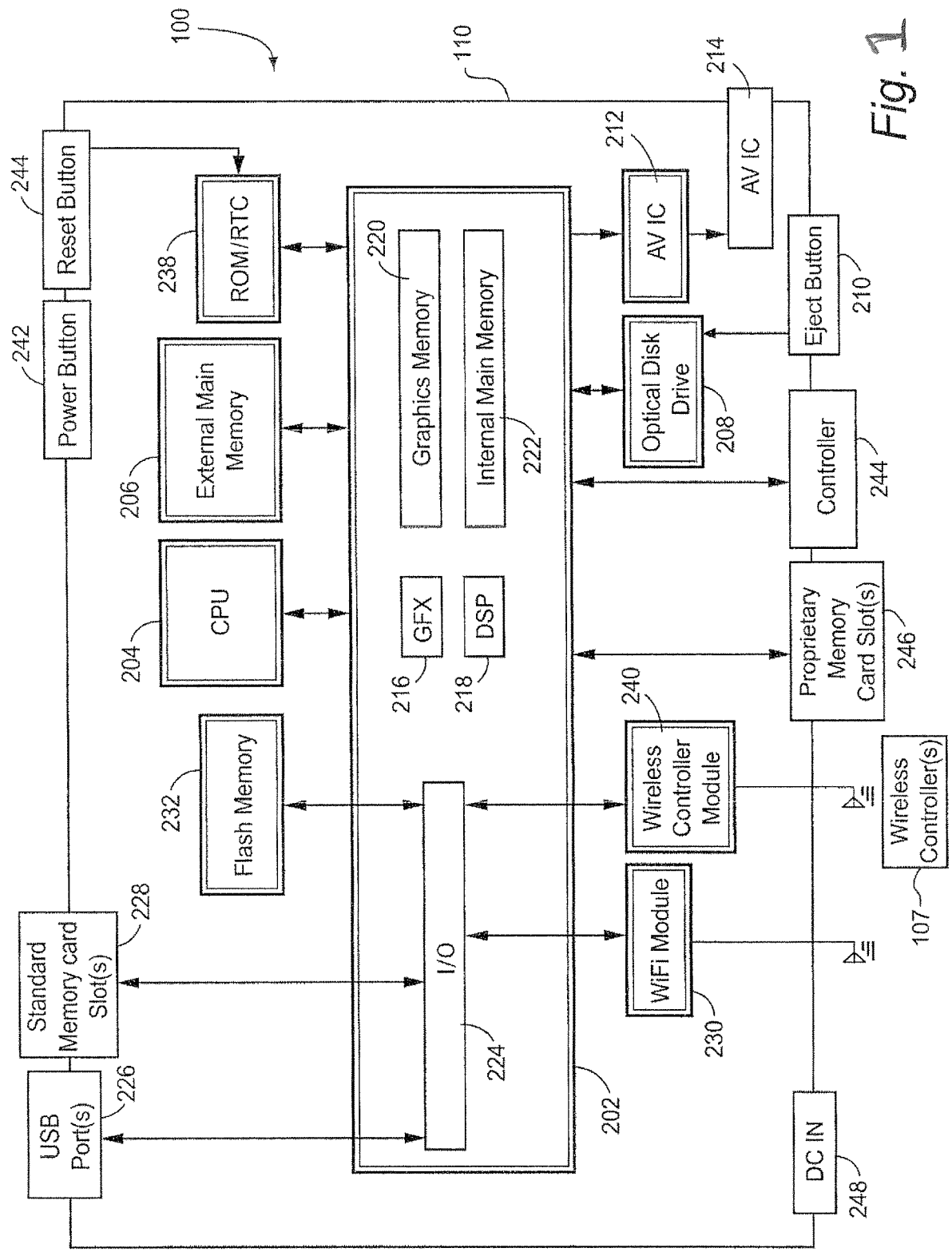
FIGS. 1 and 2 show exemplary views of a non-limiting interactive computer graphics system in the form of an apparatus for executing a program.
Figure 2:
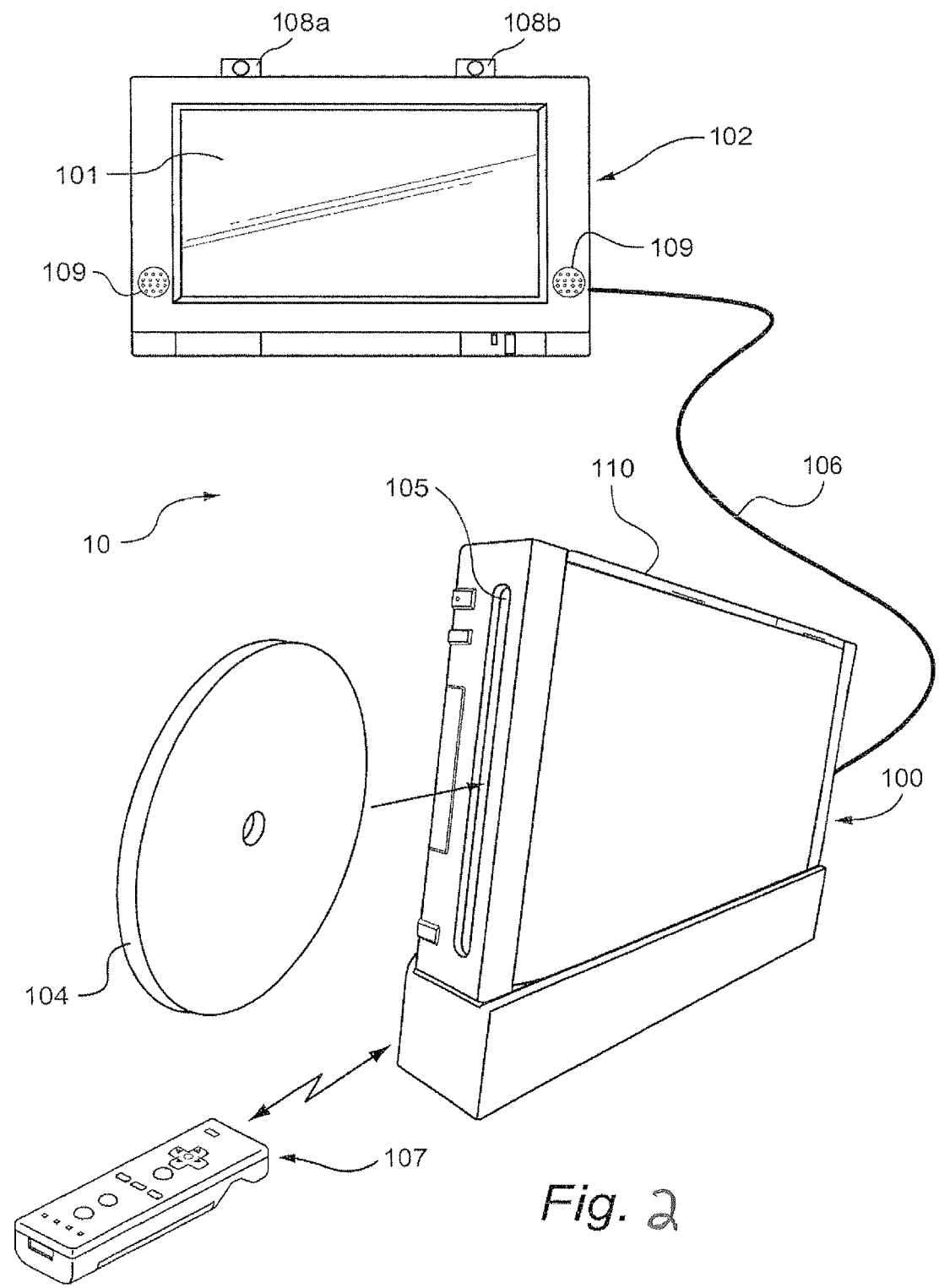

FIGS. 1 and 2 show a non-limiting example system 10 including a console 100, a television 102 and a controller 107. Console 100 executes a program or other application stored on optical disc 104 inserted into slot 105 formed in housing 110 thereof. The result of the execution of the program or other application is displayed on display 101 of television 102 to which console 100 is connected by cable 106. Audio associated with the program or other application is output via speakers 109 of television 102. While an optical disk is shown in FIG. 1 for use in storing software, the program or other application may alternatively or additionally be stored on other storage media such as semiconductor memories, magneto-optical memories, magnetic memories and the like and/or downloaded over a network or by other means.

Controller 107 wirelessly transmits data such as control data to the console 100. The control data may be generated using an operation section of controller 107 having, for example, a plurality of operation buttons, a key, a stick and the like. Controller 107 may also wirelessly receive data transmitted from console 100. Any one of various wireless protocols such as Bluetooth (registered trademark) may be used for the wireless transmissions between controller 107 and console 100.

As discussed below, controller 107 also includes an imaging information calculation section for capturing and processing images from light-emitting devices 108a and 108b. Preferably, a center point between light-emitting devices 108a and 108b is aligned with a vertical center line of television 101. The images from light-emitting devices 108a and 108b can be used to determine a direction in which controller 107 is pointing as well as a distance of controller 107 from display 101. By way of example without limitation, light-emitting devices 108a and 108b may be implemented as two LED modules (hereinafter, referred to as "markers") provided in the vicinity of a display screen of television 102. The markers each output infrared light and the imaging information calculation section of controller 107 detects the light output from the LED modules to determine a direction in which controller 107 is pointing and a distance of controller 107 from display 101 as mentioned above. As will become apparent from the description below, various implementations of the system and method for simulating the striking of an object described herein do not require use such markers.

Although markers 108a and 108b are shown in FIG. 1 as being above television 100, they may also be positioned below television 100 or in other configurations.

With reference to the block diagram of FIG. 1, console 100 includes a RISC central processing unit (CPU) 204 for executing various types of applications including (but not limited to) programs. CPU 204 executes a boot program stored in a boot ROM (not shown) to initialize console 100 and then executes an application (or applications) stored on optical disc 104 which is inserted in optical disk drive 208. User-accessible eject button 210 provided on housing 110 of console 100 may be used to eject an optical disk from disk drive 208.

In one example implementation, optical disk drive 208 receives both optical disks of a first type (e.g., of a first size and/or of a first data structure, etc.) containing applications developed for execution by CPU 204 and graphics processor 216 and optical disks of a second type (e.g., of a second size and/or a second data structure) containing applications originally developed for execution by a different CPU and/or graphics processor. For example, the optical disks of the second type may be applications originally developed for the Nintendo GameCube platform.

CPU 204 is connected to system LSI 202 that includes graphics processing unit (GPU) 216 with an associated graphics memory 220, audio digital signal processor (DSP) 218, internal main memory 222 and input/output (IO) processor 224.

IO processor 224 of system LSI 202 is connected to one or more USB ports 226, one or more standard memory card slots (connectors) 228, WiFi module 230, flash memory 232 and wireless controller module 240.

USB ports 226 are used to connect a wide variety of external devices to game console 100. These devices include by way of example without limitation controllers, keyboards, storage devices such as external hard-disk drives, printers, digital cameras, and the like. USB ports 226 may also be used for wired network (e.g., LAN) connections. In one example implementation, two USB ports 226 are provided.

Standard memory card slots (connectors) 228 are adapted to receive industry-standard-type memory cards (e.g., SD memory cards). In one example implementation, one memory card slot 228 is provided. These memory cards are generally used as data carriers. For example, a user may store data for a particular application on a memory card and bring the memory card to a friend's house to play the application on the friend's console. The memory cards may also be used to transfer data between the console and personal computers, digital cameras, and the like.

WiFi module 230 enables console 100 to be connected to a wireless access point. The access point may provide internet connectivity for on-line gaming with users at other locations (with or without voice chat capabilities), as well as web browsing, e-mail, file downloads (including game downloads) and many other types of on-line activities. In some implementations, WiFi module may also be used for communication with other devices such as suitably-equipped hand-held devices. Module 230 is referred to herein as "WiFi", which is generally used in connection with the family of IEEE 802.11 specifications. However, console 100 may of course alternatively or additionally use wireless modules that conform with other wireless standards.

Flash memory 232 stores, by way of example without limitation, save data, system files, internal applications for the console and downloaded data (such as games).

Wireless controller module 240 receives signals wirelessly transmitted from one or more controllers 107 and provides these received signals to IO processor 224. The signals transmitted by controller 107 to wireless controller module 240 may include signals generated by controller 107 itself as well as by other devices that may be connected to controller 107. By way of example, some applications may utilize separate right- and left-hand inputs. For such applications, another controller (not shown) may be connected to controller 107 and controller 107 could transmit to wireless controller module 240 signals generated by itself and by the other controller.

Wireless controller module 240 may also wirelessly transmit signals to controller 107. By way of example without limitation, controller 107 (and/or another controller connected thereto) may be provided with vibration circuitry and vibration circuitry control signals may be sent via wireless controller module 240 to control the vibration circuitry. By way of further example without limitation, controller 107 may be provided with (or be connected to) a speaker (not shown) and audio signals for output from this speaker may be wirelessly communicated to controller 107 via wireless controller module 240. By way of still further example without limitation, controller 107 may be provided with (or be connected to) a display device (not shown) and display signals for output from this display device may be wirelessly communicated to controller 107 via wireless controller module 240.

Proprietary memory card slots 246 are adapted to receive proprietary memory cards. In one example implementation, two such slots are provided. These proprietary memory cards have some non-standard feature such as a non-standard connector or a non-standard memory architecture. For example, one or more of the memory card slots 246 may be adapted to receive memory cards developed for the Nintendo GameCube platform. In this case, memory cards inserted in such slots can transfer data from games developed for the GameCube platform. In an example implementation, memory card slots 246 may be used for read-only access to the memory cards inserted therein and limitations may be placed on whether data on these memory cards can be copied or transferred to other storage media such as standard memory cards inserted into slots 228.

One or more controller connectors 244 are adapted for wired connection to respective controllers. In one example implementation, four such connectors are provided for wired connection to controllers for the Nintendo GameCube platform. Alternatively, connectors 244 may be connected to respective wireless receivers that receive signals from wireless controllers. These connectors enable users, among other things, to use controllers for the Nintendo GameCube platform when an optical disk for a game developed for this platform is inserted into optical disk drive 208.

A connector 248 is provided for connecting console 100 to DC power derived, for example, from an ordinary wall outlet. Of course, the power may be derived from one or more batteries.

GPU 216 performs image processing based on instructions from CPU 204. GPU 216 includes, for example, circuitry for performing calculations necessary for displaying three-dimensional (3D) graphics. GPU 216 performs image processing using graphics memory 220 dedicated for image processing and a part of internal main memory 222. GPU 216 generates image data for output to television 102 by audio/video connector 214 via audio/video IC (interface) 212.

Audio DSP 218 performs audio processing based on instructions from CPU 204. The audio generated by audio DSP 218 is output to television 102 by audio/video connector 214 via audio/video IC 212.

External main memory 206 and internal main memory 222 are storage areas directly accessible by CPU 204. For example, these memories can store an application program such as a program read from optical disc 104 by the CPU 204, various types of data or the like.

ROM/RTC 238 includes a real-time clock and preferably runs off of an internal battery (not shown) so as to be usable even if no external power is supplied. ROM/RTC 238 also may include a boot ROM and SRAM usable by the console.

Power button 242 is used to power console 100 on and off. In one example implementation, power button 242 must be depressed for a specified time (e.g., one or two seconds) to turn the consoled off so as to reduce the possibility of inadvertently turn-off. Reset button 244 is used to reset (re-boot) console 100.

Figure 3A:
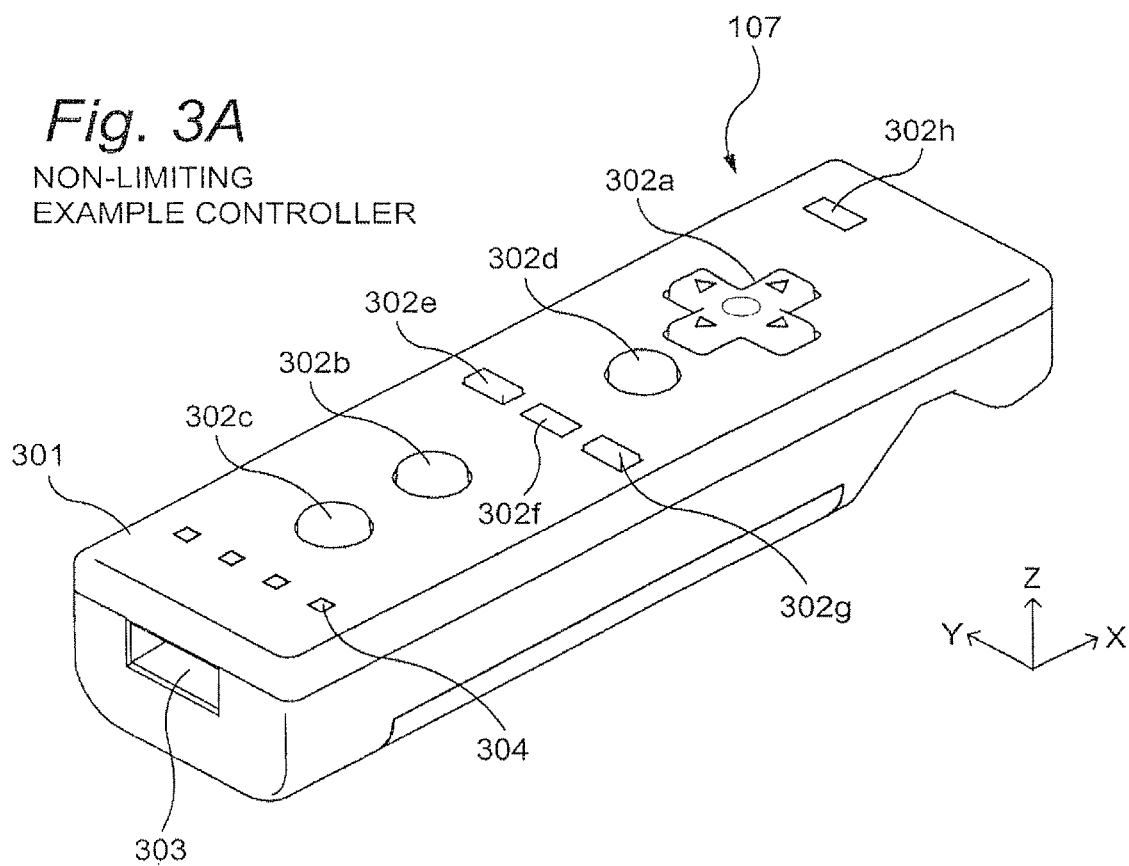
FIGS. 3A, 3B and 4 show different views of an exemplary illustrative non-limiting hand-held controller for the apparatus of FIG. 1.
Figure 3B:
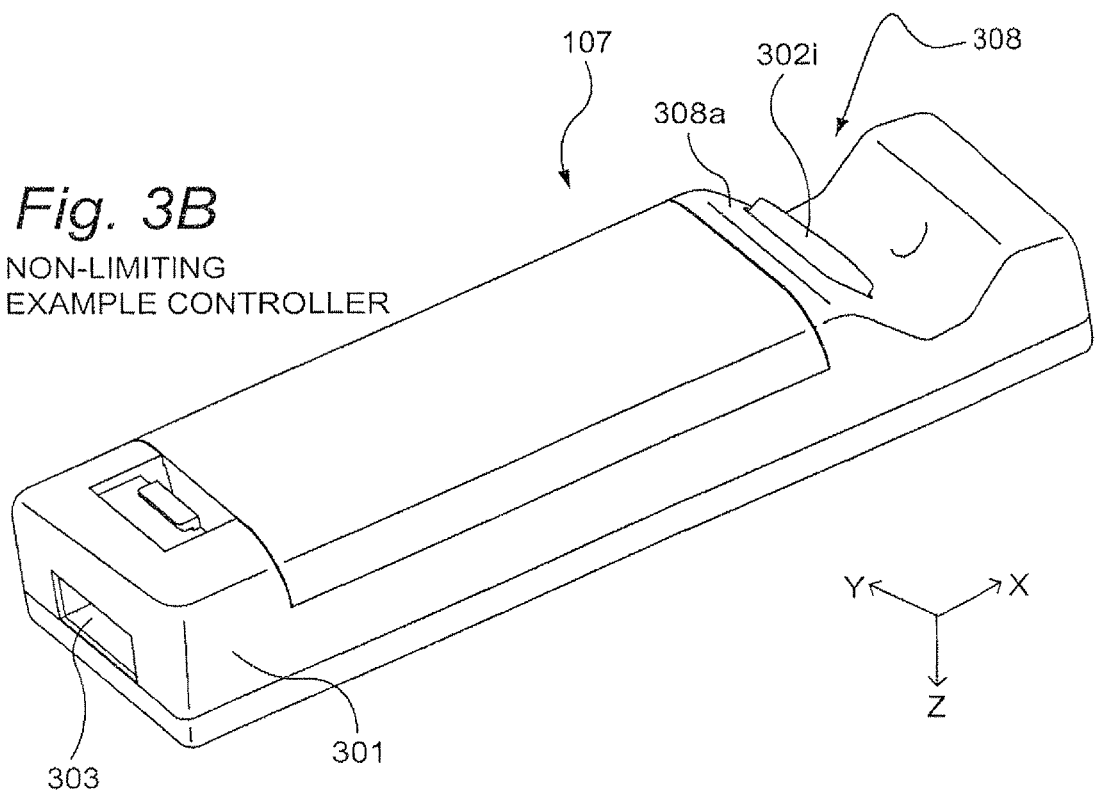
Figure 4:
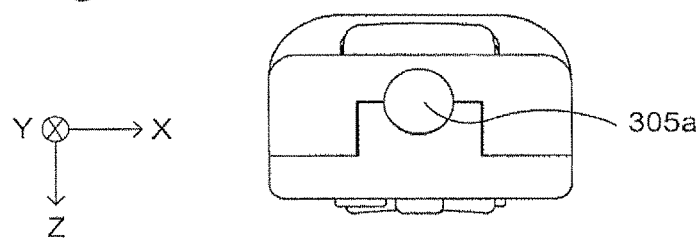

With reference to FIGS. 3 and 4, example controller 107 includes a housing 301 on which operating controls 302a-302h are provided. Housing 301 has a generally parallelepiped shape and is sized to be conveniently holdable in a user's hand. Cross-switch 302a is provided at the center of a forward part of a top surface of the housing 301. Cross-switch 302a is a cross-shaped four-direction push switch which includes operation portions corresponding to the directions designated by the arrows (front, rear, right and left), which are respectively located on cross-shaped projecting portions. A user selects one of the front, rear, right and left directions by pressing one of the operation portions of the cross-switch 302a. By actuating cross-switch 302a, the user can, for example, move a character in different directions in a virtual world.

Cross-switch 302a is described by way of example and other types of operation sections may be used. By way of example without limitation, a composite switch including a push switch with a ring-shaped four-direction operation section and a center switch may be used. By way of further example without limitation, an inclinable stick projecting from the top surface of housing 301 that outputs signals in accordance with the inclining direction of the stick may be used. By way of still further example without limitation, a horizontally slidable disc-shaped member that outputs signals in accordance with the sliding direction of the disc-shaped member may be used. By way of still further example without limitation, a touch pad may be used. By way of still further example without limitation, separate switches corresponding to at least four directions (e.g., front, rear, right and left) that output respective signals when pressed by a user may be used.

Buttons (or keys) 302b through 302g are provided rearward of cross-switch 302a on the top surface of housing 301. Buttons 302b through 302g are operation devices that output respective signals when a user presses them. For example, buttons 302b through 302d are respectively an "X" button, a "Y" button and a "B" button and buttons 302e through 302g are respectively a select switch, a menu switch and a start switch, for example. Generally, buttons 302b through 302g are assigned various functions in accordance with the application being executed by console 100. In an exemplary arrangement shown in FIG. 3, buttons 302b through 302d are linearly arranged along a front-to-back centerline of the top surface of housing 301. Buttons 302e through 302g are linearly arranged along a left-to-right line between buttons 302b and 302d. Button 302f may be recessed from a top surface of housing 701 to reduce the possibility of inadvertent pressing by a user grasping controller 107.

Button 302h is provided forward of cross-switch 302a on the top surface of the housing 301. Button 302h is a power switch for remote on-off switching of the power to console 100. Button 302h may also be recessed from a top surface of housing 301 to reduce the possibility of inadvertent pressing by a user.

A plurality (e.g., four) of LEDs 304 is provided rearward of button 302c on the top surface of housing 301. Controller 107 is assigned a controller type (number) so as to be distinguishable from the other controllers used with console 100 and LEDs may 304 may be used to provide a user a visual indication of this assigned controller number. For example, when controller 107 transmits signals to wireless controller module 240, one of the plurality of LEDs corresponding to the controller type is lit up.

With reference to FIG. 3B, a recessed portion 308 is formed on a bottom surface of housing 301. Recessed portion 308 is positioned so as to receive an index finger or middle finger of a user holding controller 107. A button 302i is provided on a rear, sloped surface 308a of the recessed portion. Button 302i functions, for example, as an "A" button which can be used, by way of illustration, as a trigger switch in a shooting game.

As shown in FIG. 4, an imaging element 305a is provided on a front surface of controller housing 301. Imaging element 305a is part of an imaging information calculation section of controller 107 that analyzes image data received from markers 108a and 108b. Imaging information calculation section 305 has a maximum sampling period of, for example, about 200 frames/sec., and therefore can trace and analyze even relatively fast motion of controller 107. The techniques described herein of simulating the striking of an object can be achieved without using information from imaging information calculation section 305, and thus further detailed description of the operation of this section is omitted. Additional details may be found in Application No. 60/716,937 filed on Sep. 15, 2005; 60/732,648, entitled "INFORMATION PROCESSING PROGRAM," filed on Nov. 3, 2005; and application No. 60/732,649, entitled "INFORMATION PROCESSING SYSTEM AND PROGRAM THEREFOR," filed on Nov. 3, 2005. The entire contents of each of these applications are incorporated herein.

Connector 303 is provided on a rear surface of controller housing 301. Connector 303 is used to connect devices to controller 107. For example, a second controller of similar or different configuration may be connected to controller 107 via connector 303 in order to allow a user to play games using control inputs from both hands. Other devices including controllers for other consoles, input devices such as keyboards, keypads and touchpads and output devices such as speakers and displays may be connected to controller 107 using connector 303.

For ease of explanation in what follows, a coordinate system for controller 107 will be defined. As shown in FIGS. 3 and 4, a left-handed X, Y, Z coordinate system has been defined for controller 107. Of course, this coordinate system is described by way of example without limitation and the systems and methods described herein are equally applicable when other coordinate systems are used.

Figure 5:
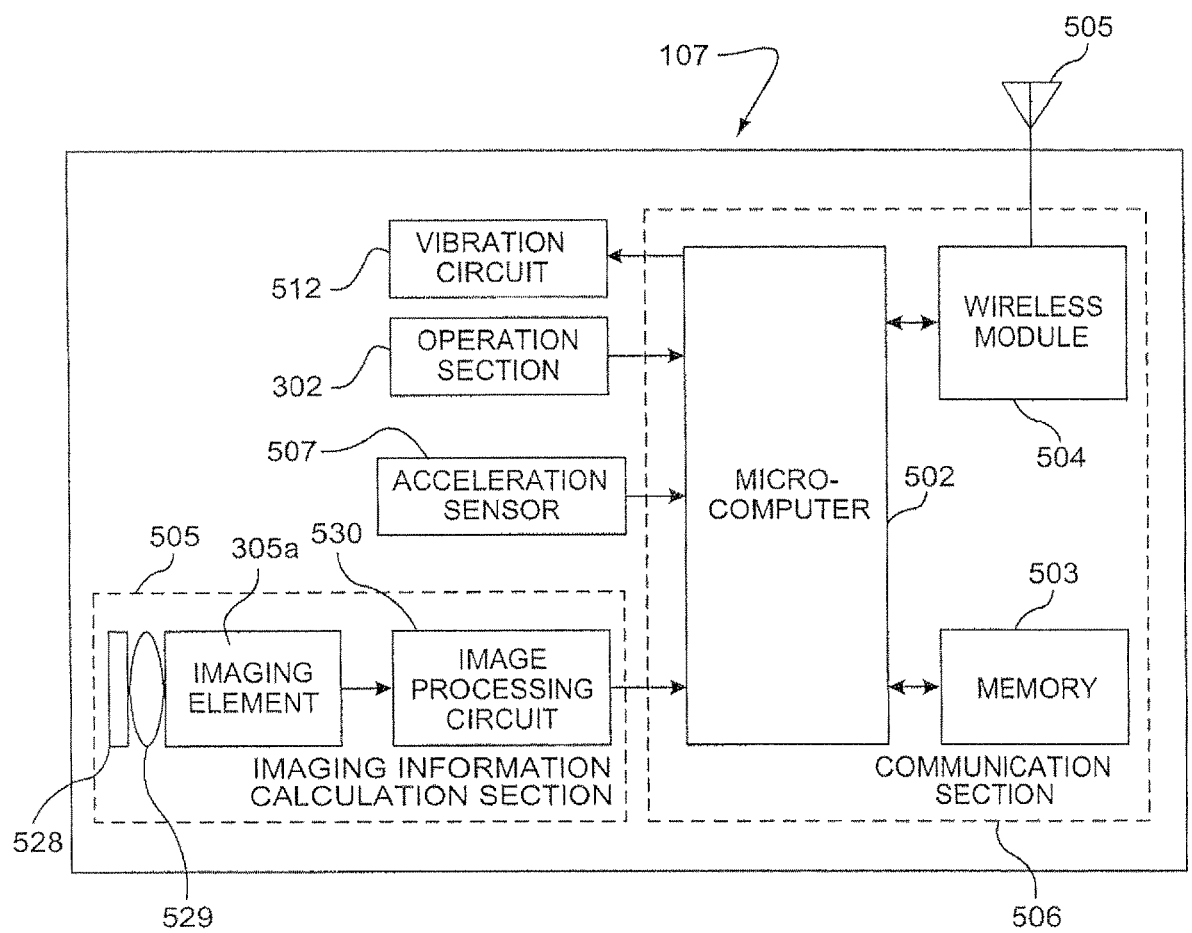
FIG. 5 is a block diagram of an exemplary illustrative non-limiting implementation of the hand-held controller.

As shown in the block diagram of FIG. 5, controller 107 includes a three-axis, linear acceleration sensor 507 that detects linear acceleration in three directions, i.e., the up/down direction (Y-axis), the left/right direction (Z-axis), and the forward/backward direction (X-axis). Alternatively, a two-axis linear accelerometer that only detects linear acceleration along the Y-axis may be used. Generally speaking, the accelerometer arrangement (e.g., three-axis or two-axis) will depend on the type of control signals desired. As a non-limiting example, the three-axis or two-axis linear accelerometer may be of the type available from Analog Devices, Inc. or STMicroelectronics N.V. Preferably, acceleration sensor 507 is an electrostatic capacitance or capacitance-coupling type that is based on silicon micro-machined MEMS (micro-electromechanical systems) technology.

However, any other suitable accelerometer technology (e.g., piezoelectric type or piezoresistance type) now existing or later developed may be used to provide three-axis or two-axis linear acceleration sensor 507.

As one skilled in the art understands, linear accelerometers, as used in acceleration sensor 507, are only capable of detecting acceleration along a straight line corresponding to each axis of the acceleration sensor. In other words, the direct output of acceleration sensor 507 is limited to signals indicative of linear acceleration (static or dynamic) along each of the two or three axes thereof. As a result, acceleration sensor 507 cannot directly detect movement along a non-linear (e.g. arcuate) path, rotation, rotational movement, angular displacement, tilt, position, attitude or any other physical characteristic.

However, through additional processing of the linear acceleration signals output from acceleration sensor 507, additional information relating to controller 107 can be inferred or calculated (i.e., determined), as one skilled in the art will readily understand from the description herein. For example, by detecting static, linear acceleration (i.e., gravity), the linear acceleration output of acceleration sensor 507 can be used to determine tilt of the object relative to the gravity vector by correlating tilt angles with detected linear acceleration. In this way, acceleration sensor 507 can be used in combination with micro-computer 502 of controller 107 (or another processor) to determine tilt, attitude or position of controller 107. Similarly, various movements and/or positions of controller 107 can be calculated through processing of the linear acceleration signals generated by acceleration sensor 507 when controller 107 containing acceleration sensor 307 is subjected to dynamic accelerations by, for example, the hand of a user, as will be explained in detail below.

In another embodiment, acceleration sensor 507 may include an embedded signal processor or other type of dedicated processor for performing any desired processing of the acceleration signals output from the accelerometers therein prior to outputting signals to micro-computer 502. For example, the embedded or dedicated processor could convert the detected acceleration signal to a corresponding tilt angle (or other desired parameter) when the acceleration sensor is intended to detect static acceleration (i.e., gravity).

Returning to FIG. 5, image information calculation section 505 of controller 107 includes infrared filter 528, lens 529, imaging element 305a and image processing circuit 530. Infrared filter 528 allows only infrared light to pass therethrough from the light that is incident on the front surface of controller 107. Lens 529 collects and focuses the infrared light from infrared filter 528 on imaging element 305a. Imaging element 305a is a solid-state imaging device such as, for example, a CMOS sensor or a CCD. Imaging element 305a captures images of the infrared light from markers 108a and 108b collected by lens 309. Accordingly, imaging element 305a captures images of only the infrared light that has passed through infrared filter 528 and generates image data based thereon. This image data is processed by image processing circuit 520 which detects an area thereof having high brightness, and, based on this detecting, outputs processing result data representing the detected coordinate position and size of the area to communication section 506. From this information, the direction in which controller 107 is pointing and the distance of controller 107 from display 101 can be determined.

Vibration circuit 512 may also be included in controller 107. Vibration circuit 512 may be, for example, a vibration motor or a solenoid. Controller 107 is vibrated by actuation of the vibration circuit 512 (e.g., in response to signals from console 100), and the vibration is conveyed to the hand of the user holding controller 107. Thus, a so-called vibration-responsive game may be realized.

As described above, acceleration sensor 507 detects and outputs the acceleration in the form of components of three axial directions of controller 107, i.e., the components of the up-down direction (Z-axis direction), the left-right direction (X-axis direction), and the front-rear direction (the Y-axis direction) of controller 107. Data representing the acceleration as the components of the three axial directions detected by acceleration sensor 507 is output to communication section 506. Based on the acceleration data which is output from acceleration sensor 507, a motion of controller 107 can be determined.

Communication section 506 includes micro-computer 502, memory 503, wireless module 504 and antenna 505. Micro-computer 502 controls wireless module 504 for transmitting and receiving data while using memory 503 as a storage area during processing. Micro-computer 502 is supplied with data including operation signals (e.g., cross-switch, button or key data) from operation section 302, acceleration signals in the three axial directions (X-axis, Y-axis and Z-axis direction acceleration data) from acceleration sensor 507, and processing result data from imaging information calculation section 505. Micro-computer 502 temporarily stores the data supplied thereto in memory 503 as transmission data for transmission to console 100. The wireless transmission from communication section 506 to console 100 is performed at a predetermined time interval. Because processing is generally performed at a cycle of 1/60 sec. (16.7 ms), the wireless transmission is preferably performed at a cycle of a shorter time period. For example, a communication section structured using Bluetooth (registered trademark) technology can have a cycle of 5 ms. At the transmission time, micro-computer 502 outputs the transmission data stored in memory 503 as a series of operation information to wireless module 504. Wireless module 504 uses, for example, Bluetooth (registered trademark) technology to send the operation information from antenna 505 as a carrier wave signal having a specified frequency. Thus, operation signal data from operation section 302, the X-axis, Y-axis and Z-axis direction acceleration data from acceleration sensor 507, and the processing result data from imaging information calculation section 505 are transmitted from controller 107. Console 100 receives the carrier wave signal and demodulates or decodes the carrier wave signal to obtain the operation information (e.g., the operation signal data, the X-axis, Y-axis and Z-axis direction acceleration data, and the processing result data). Based on this received data and the application currently being executed, CPU 204 of console 100 performs application processing. If communication section 506 is structured using Bluetooth (registered trademark) technology, controller 107 can also receive data wirelessly transmitted thereto from devices including console 100.

The exemplary illustrative non-limiting system described above can be used to execute software stored on optical disk 104 or in other memory that controls it to interactive generate displays on display 101 of a progressively deformed object in response to user input provided via controller 107. Exemplary illustrative non-limiting software controlled techniques for generating such displays will now be described.

Example Simulation Operation

In one exemplary illustrative non-limiting implementation, the simulation allows an object to be launched into mid-air. For example, a truck, snow skis or the like may follow a path over a ramp or jump or drive over a cliff so that it may fly through the air to a destination. During such mid-air flights, the exemplary illustrative non-limiting implementation allows the user to affect the attitude and/or velocity of the vehicle in mid-air through additional manipulation of the hand-held controller. In one specific exemplary illustrative non-limiting implementation, when the user rotates his or her hands toward the body to pitch the controller back toward his or her body, the simulated vehicle shown on the display similarly moves "nose up". In a similar fashion, the user can cause the simulated vehicle to move "nose down" by rotating his or her hands away from the body. Such simulated motion can be provided even though, in one particular non-limiting implementation, the simulated vehicle has no capability to make such movements if the laws of physics were to apply.

Other exemplary illustrative non-limiting implementations may for example use similar user inputs to fire steering rockets, control aileron positions, etc. to allow the vehicle to change its attitude in a way that would be possible under the laws of physics.

In one exemplary illustrative non-limiting implementation, the system performs a velocity calculation and comparison based at least in part on the velocity the vehicle was traveling before it left the ground. One exemplary illustrative non-limiting implementation computes a new velocity based for example on a function of the old or previous velocity and the amount of tilt, and the vehicle speed can speed up or slow down depending on a comparison between newly calculated and previous velocity. Different constant multiplications or other functions can be used depending on whether tilt is in a forward direction or in a backward direction.

Techniques described herein can be performed on any type of computer graphics system including a personal computer, a home machine, a portable machine, a networked server and display, a cellular telephone, a personal digital assistant, or any other type of device or arrangement having computation and graphical display capabilities.

Figure 6:
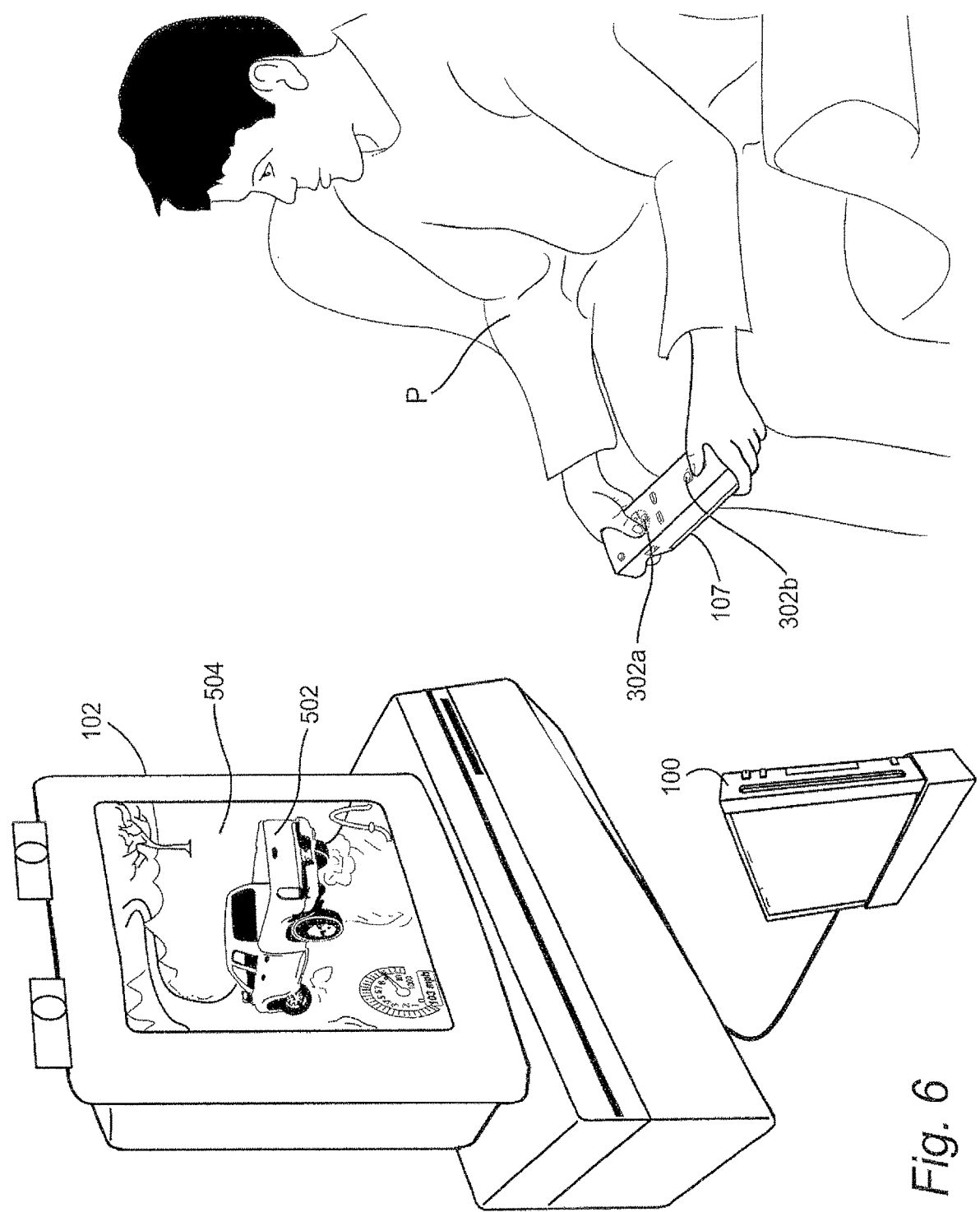
FIG. 6 shows an exemplary illustrative non-limiting use of a simulation.
Figure 6A:
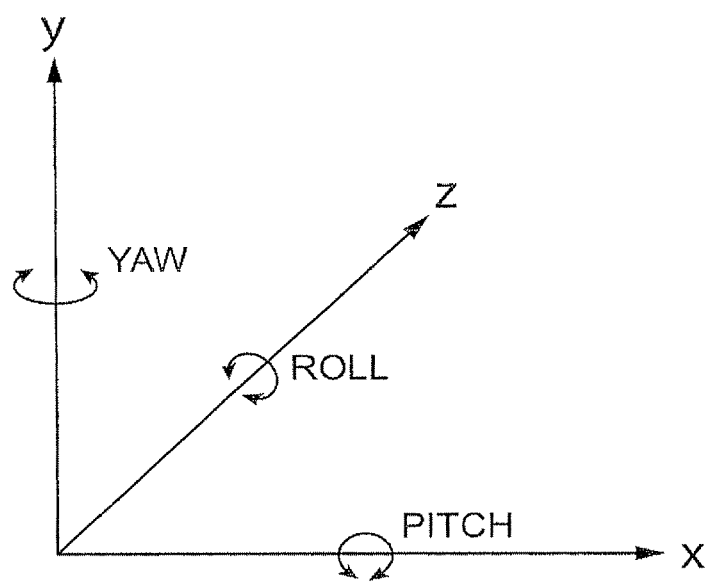
FIG. 6A graphically shows three degrees of motion.

FIG. 6 shows an exemplary illustrative non-limiting use of console 100 and overall system to play a driving simulation involving for example a truck 502 through a virtual landscape 504. In the exemplary illustrative non-limiting implementation, the user P holds hand-held controller 107 sideways in both hands and uses it to simulate a steering wheel. Using the conventional terminology of "pitch," "yaw" and "roll" where pitch refers to rotation about the X axis, yaw refers to rotation about the Y axis and roll refers to rotation about the Z axis (see FIG. 6A), when user P uses both hands to change the roll of the hand-held controller 107, the simulated vehicle 502 steers. Thus, for example, if the user P moves his or her hands such that the left hand moves downwards and the right hand moves upwards (with each hand holding an end of the remote 107), the simulated truck 502 steers to the left. Similarly, if the user P moves his hands so that the right hand moves downwards and the left hand moves upwards, the simulated truck 502 steers to the right. Such a simulated truck can obey the laws of physics while its wheels are in contact with the ground of virtual landscape 504. Buttons on the controller 107 can be operated by the thumb or thumbs for example to provide acceleration and deceleration or other vehicle effects (e.g., firing rockets, firing weapons, etc).

In exemplary illustrative non-limiting implementation, part of virtual landscape 504 includes opportunities for the simulated truck 502 to fly through the air. For example, the truck may be driven up a ramp or other jump in order to become suspended in mid-air. Or, the truck 502 may drive off a cliff or other sudden drop. Unlike in the real world where a large truck would almost immediately drop due to the force of gravity, the exemplary illustrative non-limiting implementation permits the simulated truck 502 to fly through the air while descending slowly toward the ground. The simulated velocity of the truck as it travels through the air may have a relationship to the truck's velocity before it left the ground in one exemplary illustrative non-limiting implementation.

In an exemplary illustrative non-limiting implementation, the user P can exert control over the simulated motion of the vehicle while it is in mid-air. For example, changing the yaw or roll of the hand-held controller 107 can cause the path of truck 502 to steer to the left or right even though the truck is in mid-air and there is no visible or even logical reason why, if the laws of physics were being applied, the truck could be steered in this fashion. In one example non-limiting implementation, only the Roll axis is used for this purpose (it is not possible in some implementations to detect Yaw angles using certain configurations of accelerometers, because the direction of gravity does not change with regard to the controller). Other implementations that use both roll and yaw or just yaw, or pitch in various ways are of course possible.

Under Newtonian Physics, presumably the only way the simulated truck 502 could change its course while in mid-air would be for the truck to apply a force against its environment and for the environment to apply an equal and opposite force against it. Since the user P may imagine that he or she is behind the wheel of the simulated truck 502, there is no way in reality using the steering wheel that the truck operator could have much influence over the path the truck takes as if flies through mid-air. The virtual truck 502 can be equipped with rockets, but in the real world the rockets would have to be huge to sustain the truck in flight. However, the exemplary illustrative non-limiting implementation is a video game rather than a close simulation of reality, and therefore the laws of physics can be partially suspended in the interest of fun and excitement.

Figure 7A:
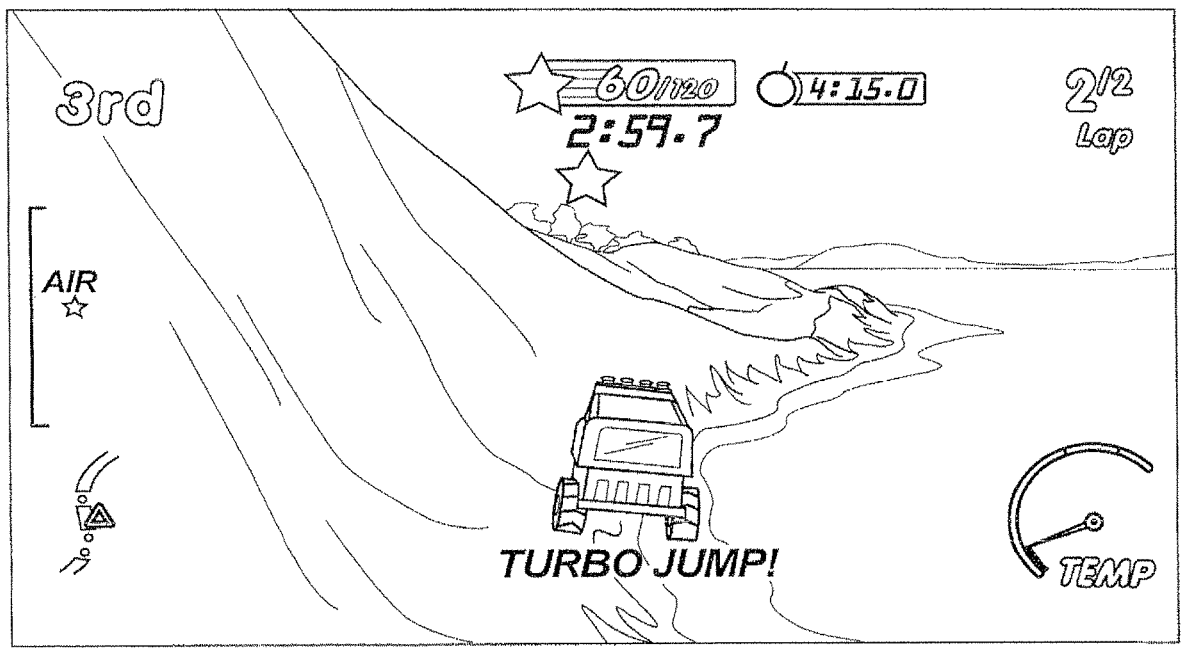
FIGS. 7A and 7B show an exemplary no tilt scenario.
Figure 7B:
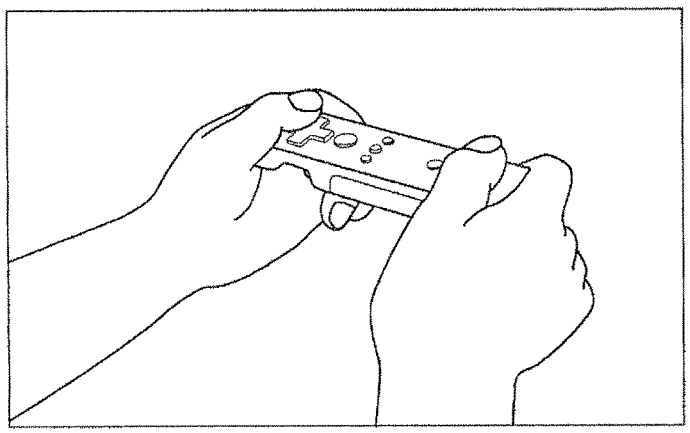
Figure 8A:
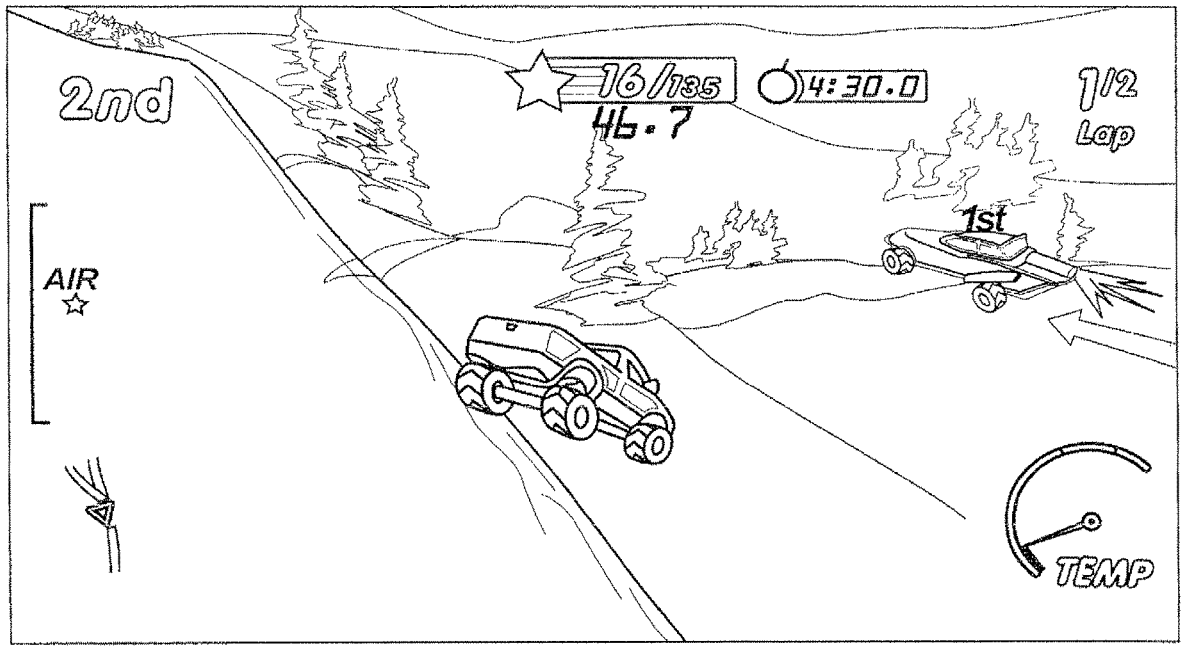
FIGS. 8A and 8B show an exemplary tilt down scenario.
Figure 9A:
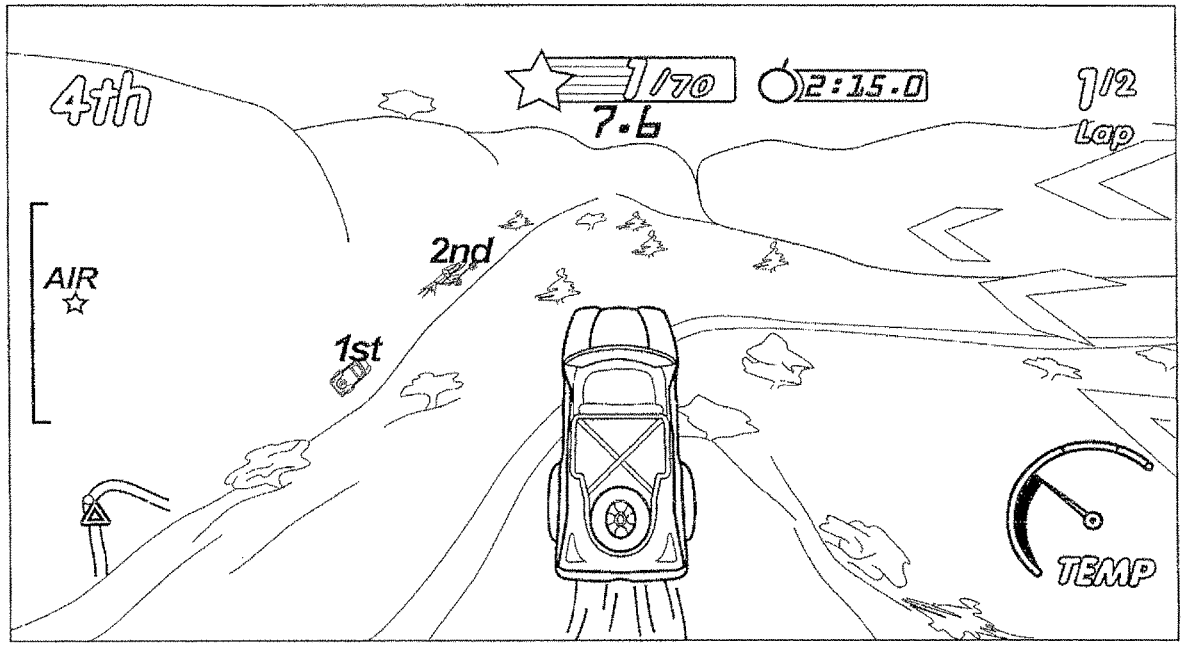
FIGS. 9A and 9B show an exemplary tilt up scenario.

In one exemplary illustrative non-limiting implementation, the hand-held remote 107 can be moved in another degree of freedom—in this case by changing its pitch. As shown in FIG. 7A, if the user P holds hand-held remote 107 in a slightly inclined but relatively natural and level attitude (see FIG. 7B), the simulated truck 502 in mid-air will maintain an attitude that is substantially level. However, if the user P tilts the remote 107 forward (thereby establishing a forward pitch), the simulated truck 502 similarly moves to an inclination where the front of the truck faces downward while it is in mid-air (see FIG. 8A). The amount of such a tilt can also affect the velocity the truck 502 travels while it is mid-air. In the exemplary illustrative non-limiting implementation, if the video user P pitches the inclination of remote 107 upwards (see FIG. 9A), the simulated truck 502 will similarly move to an attitude where the front or nose of the truck inclines upwardly while the truck is descending through mid-air—and the amount of such tilt can similarly affect the velocity.

Figure 8B:
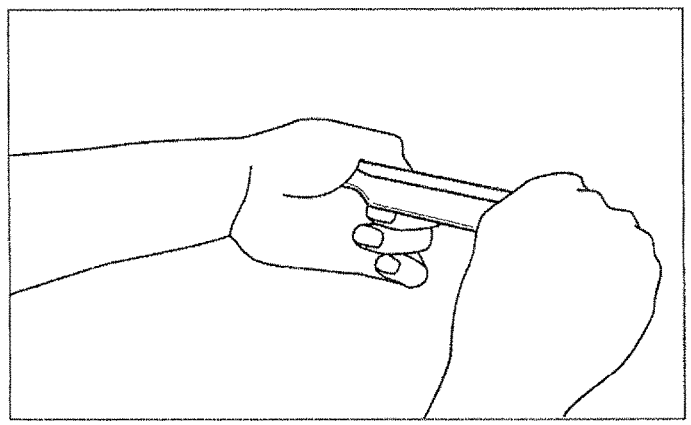
Figure 9B:
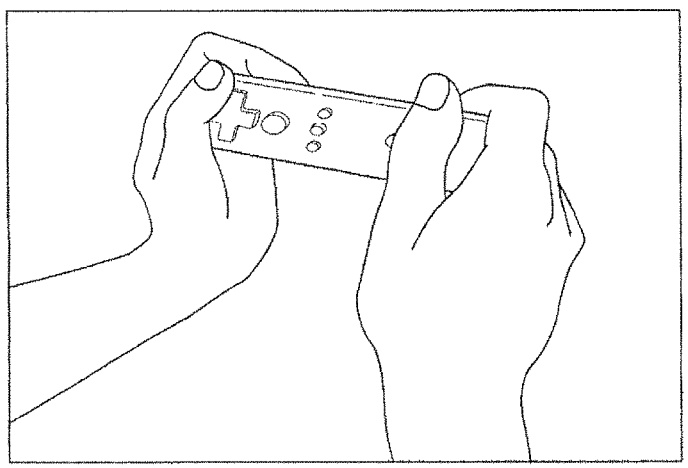
Figure 10:
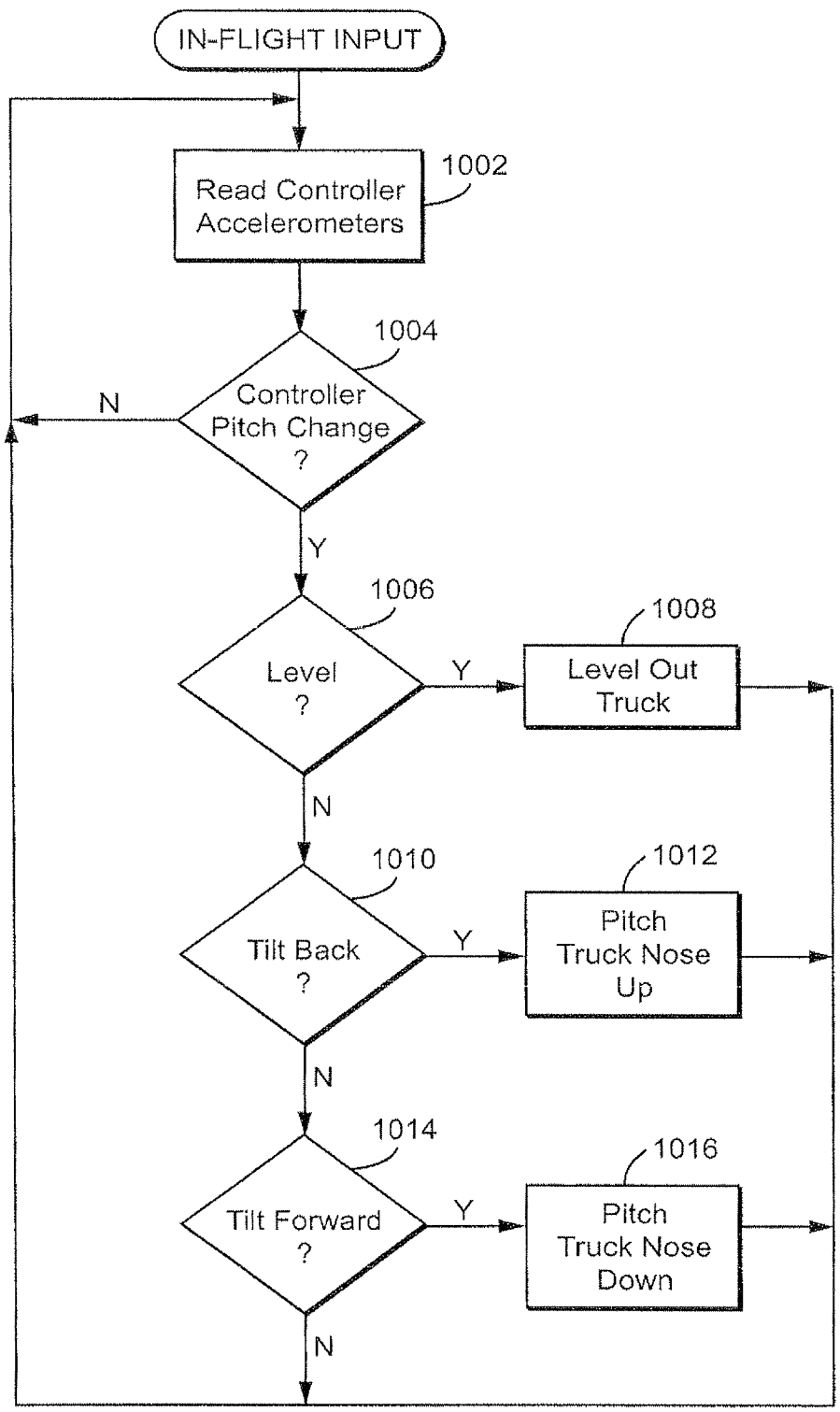
FIG. 10 shows an exemplary illustrative non-limiting software flowchart.

FIG. 10 shows an exemplary illustrative non-limiting software flow of code that may be disposed on the storage device such as an optical disk inserted into console 100 or a flash or other resident or non-resident memory into which software code is downloaded. Referring to FIG. 10, when the simulated truck 502 is in flight, the exemplary illustrative non-limiting implementation causes the console 100 to read the inputs provided by the three axis accelerometer within the hand-held remote 107 (block 1002) to detect controller attitude or inclination. If no controller pitch change is sensed ("no" exit to decision block 1004), control flow returns to block 1002. However, if the console 100 senses that the remote 107 pitch has changed ("yes" exit to decision block 1004), then the console 100 determines whether the current remote attitude is level (as in FIG. 7B), tilted back (as in FIG. 9B), or tilted forward (as in FIG. 8B). The console 100 will, using conventional 3-D transformations well known to those skilled in the art (see for example Foley and Van Dam, *Computer Graphics*, Principles & Practice (2d Ed. 1990) at Chapter 5, incorporated herein by reference), apply transformations to the model of virtual truck 502 to cause the truck to adopt the same pitch as the hand-held remote 107. An additional bias can be built in if necessary to make level truck attitude (see FIG. 7A) correspond to a slightly upturned hand-held controller attitude (see FIG. 7B). Such processes performed by blocks 1006-1016 may be performed continuously as hand-held controller 107 attitude and pitch changes in order to make the simulated truck 502 follow the attitude of the hand-held controller in real time.

Figure 11:
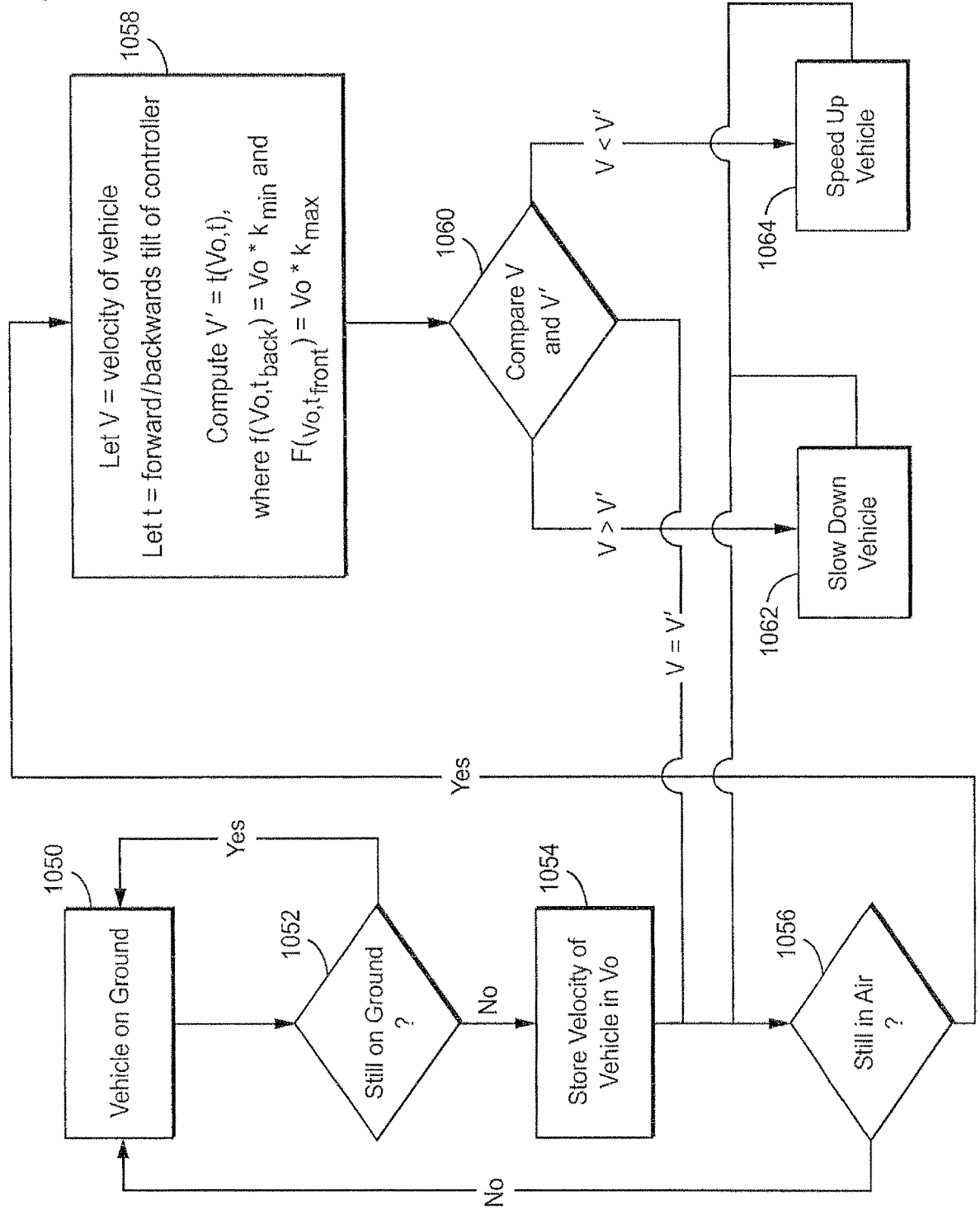
FIG. 11 is an exemplary illustrative additional non-limiting software flowchart.

FIG. 11 is a flowchart of an additional exemplary non-limiting implementation of a software flowchart illustrating one way that controller tilt can affect velocity of the truck 502. In the FIG. 11 example, the vehicle typically starts with its wheels on the ground (block 1050). If the vehicle continues to stay in contact with the ground or other suspending surface, the exemplary illustrative non-limiting tilt function is not necessarily activated in one non-limiting implementation ("yes" exit to decision block 1052). If the vehicle has left the ground ("no" exit to decision block 1052), then the velocity of the vehicle before it left the ground or other surface is stored in a variable $V_o$.

If the vehicle remains in the air ("yes" exit to decision block 1056), then V is set to be the current (initial) velocity of the vehicle and the variable t is set to be the forward/backwards tilt of the controller (block 1058). The system then computes a new "mid-air" velocity as a function f of the initial velocity and the amount of tilt. In the exemplary illustrative non-limiting implementation, the function f can be defined differently depending on whether the controller tilt is forward or backward, for example:

$$f(V_o, t_{back}) = V_o * k_{max}$$

$$f(V_o, t_{front}) = V_o * k_{min}.$$

(see block 1058). The exemplary illustrative non-limiting implementation thus applies different constant or non-constant velocity correction factors for forward and backward tilt. Backward tilt of controller 107 can slow the vehicle down, and forward tilt can speed the vehicle up. In another non-limiting example, forward tilt of controller 107 can slow the vehicle down, and backward tilt can speed the vehicle up. These effects can be used for example in conjunction with a constant simulated gravitational force (causing the truck to drop at a constant rate) to permit the user to control where the truck lands. The force of gravity need not be accurate for example rather than 9.81 meters per second some other (e.g., lesser) constant could be used so the truck remains suspended in the air longer than it would in the real world. Other functions, effects and simulations are possible.

In one exemplary illustrative non-limiting implementation, the current vehicle velocity V is compared to the newly computed vehicle velocity V' (block 1060). If the current velocity is greater than the newly calculated velocity (V>V'), the animation slows down the apparent vehicle velocity (block 1062). The animation speeds up the apparent vehicle velocity if the current velocity is less than the newly calculated velocity (V<V') (block 1064). Control then returns to decision block 1056 to determine whether the vehicle is still in the air (if so, processing of block 1058 and following is repeated).

Although the exemplary illustrative non-limiting implementation is described in connection with a truck, any type of vehicle or other object could be used. While the simulated truck described above has no visible means of controlling its own attitude, so that the laws of Newtonian Physics will be selectively suspended or not closely modelled, other more accurate models and simulations (e.g., flight simulators of aircraft or spacecraft, flying projectiles such as missiles or balls, etc.) could be modelled and displayed in addition or substitution. While the controller 107 described above senses its orientation and tilt through use of accelerometers, any type of tilt sensing mechanism (e.g., mercury switches as in the above-referenced Jacobs patent, gyroscopes such as single chip micromachined coriolis effect or other types of gyros, variable capacitive or inductive, or any other type of sensing mechanisms capable of directly and/or indirectly sensing rotation, orientation or inclination could be used instead or in addition). While a wireless remote handheld controller that can sense its own orientation is used in the exemplary illustrative non-limiting implementation, other implementations using joysticks, trackballs, mice, 3D input controllers such as the Logitech Magellan, or other input devices are also possible.

While the technology herein has been described in connection with exemplary illustrative non-limiting implementations, the invention is not to be limited by the disclosure. The invention is intended to be defined by the claims and to cover all corresponding and equivalent arrangements whether or not specifically disclosed herein.

I claim:

1. A system for manipulating an object comprising:
a linear accelerometer sensor disposed within a handheld housing and configured to sense tilt of the handheld housing, the linear accelerometer sensor comprising an electrostatic capacitance or capacitance-coupling type silicon micro-machined MEMS micro-electromechanical systems sensor, the sensor supplying a signal indicating sensed tilt to a processor;
the processor being connected to receive the signal and configured to control an object to fall in a downward falling direction towards a surface and at the same time move forward in a forward direction perpendicular to the downward falling direction at a forward velocity, and to adjust the forward velocity in the forward direction of said falling object at least in part responsively to said sensed signal, by decreasing the forward velocity of the falling object in the forward direction in response to detected tilt in a first direction and increasing the forward velocity of the falling object in the forward direction in response to detected tilt in a second direction different from the first direction.

2. The system of claim 1, wherein the processor changes the object traveling direction at least in response to said sensed tilt.

3. The system of claim 1, wherein said processor controllably inclines the object upwardly or downwardly while the object falls through the air but not when the object is in contact with a surface, and the processor uses the amount of inclination to affect the forward velocity of the object as it falls through the air.

4. The system of claim 1, wherein said tilt corresponds to at least one of a yaw, a pitch, and a roll.

5. The system of claim 1, wherein the processor is configured to adjust the pitch of said object in response to the sensed tilt.

6. The system of claim 1, wherein the processor is further configured to determine an input device neutral tilt corresponding to an object neutral orientation.

7. The system of claim 6, wherein the processor is configured to cause the object to adopt the same orientation away from said object neutral orientation as the input device is tilted away from said input device neutral tilt.

8. The system of claim 1, wherein the processor is configured to specify if said object is in contact with a surface, and ignores aspects of tilt of the handheld housing other than tilt about a single predetermined axis whenever said object is in contact with a surface.

9. The system of claim 8, wherein the handheld housing has an upper face and said predetermined axis is substantially perpendicular to the upper face of the handheld housing, the handheld housing upper face having at least a control button provided thereon.

10. A non-transitory storage device that stores instructions for execution by a computer processor to control an object at least in part responsive to movement of a handheld input device having at least one inertial sensor therein, the inertial sensor having an output, the instructions comprising:
   first program instructions for controlling the processor to provide a surface, and an object moving along the surface at a velocity v;
   second program instructions controlling the processor to detect tilt of the handheld input device in response to the inertial sensor output;
   third program instructions controlling the processor to continually adjust the mid-air lateral velocity v of said object at least in part responsively to detected tilt, including decreasing the lateral velocity v of the falling object in response to detected tilt in a first direction, and increasing the lateral velocity v of the falling object in response to detected tilt in a second direction different from the first direction.

11. The non-transitory storage device of claim 10, further comprising fourth program instructions for controlling the processor to cause the object to break contact with the surface and return said object back to contact with said surface.

12. Apparatus, provided with at least a display and a handheld input device having at least one inertial sensor therein, comprising:
   a programmed virtual object first movement process that displays a virtual object moving laterally along a displayed virtual surface;
   a programmed tilt determination process that determines changes in tilt of the input device in response to signals the inertial sensor provides; and
   a programmed object adjustment process that adjusts said falling virtual object display to decrease the velocity v of the falling virtual object in response to detected tilt changes in a first direction, to increase the velocity v of the falling virtual object in response to detected tilt changes in a second direction different from the first direction.

13. A method of providing a simulation comprising:
   (a) sensing rotation of a handheld device having an inertial sensor therein;
   (b) using a computer processor, steering a falling object at least in part in response to sensed rotation of said handheld device about a first axis;
   (c) using the computer processor, controlling the pitch of said falling object at least in part in response to sensed rotation of said handheld device about a second axis that is substantially orthogonal to said first axis thereby varying a tilt amount of the falling object in response to sensed tilt of the handheld device;
   (d) using the computer processor, decreasing the velocity v at which the falling object is moving forward in a direction different from the downward falling direction in response to detected tilt about the first axis; and
   (e) using the computer processor, increasing the velocity v at which the object is moving forward in said direction different from the downward falling direction in response to detected tilt about the second axis.

14. The method of claim 13 wherein said pitch controlling comprises controlling the pitch amount of the falling object while the object is in mid-air in response to sensed tilt orientation of the handheld device.

15. A method of controlling a virtual object as it moves through free space controlled by a user holding a bar-shaped device, the method comprising:
   (a) sensing with at least one inertial sensor disposed within the bar-shaped device, first rotation of said bar-shaped device responsive to up and down motion;
   (b) sensing, with the at least one inertial sensor, second rotation of said bar-shaped device responsive to forward and backward rotation;
   (c) using a computer processor, at least in part controlling the path of said virtual object as it falls downward through a virtual world at least in part in response to said sensed first rotation;
   (d) using the computer processor, at least in part controlling the pitch of said falling virtual object in response to said sensed second rotation;
   (e) using the computer processor, decreasing the forward velocity v of the falling virtual object in response to said forward rotation;
   (f) using the computer processor, increasing the velocity v of the falling virtual object in response to said backward rotation; and
   (g) varying a tilt amount of the virtual object in response to sensed tilt of the bar-shaped device.

16. A system for manipulating an object comprising:
   a linear accelerometer sensor disposed within a handheld housing and configured to sense tilt of the handheld housing, the linear accelerometer sensor comprising an electrostatic capacitance or capacitance-coupling type silicon micro-machined MEMS micro-electromechanical systems sensor, the sensor supplying a signal indicating sensed tilt to a processor;
   the processor being connected to receive the signal and configured to control an object to fall towards a surface and at the same time move forward at a forward velocity, and to adjust the forward velocity of said falling object at least in part responsively to said sensed signal, by decreasing the forward velocity at which the falling object is moving in response to detected tilt in a first direction and increasing the forward velocity at which the falling object is moving in response to detected tilt in a second direction different from the first direction;
   wherein the processor continually adjusts the velocity v of said displayed objects based on the following:

$$f(V_o, t\text{back}) = V_o * k\text{max, and}$$

$$f(V_o, t\text{front}) = V_o * k\text{min,}$$

the processor varying a tilt amount of the falling object in response to sensed tilt of the handheld housing.

17. A method of manipulating a virtual object comprising:
using a processor, displaying a virtual object moving along a virtual surface;
using an inertial sensor disposed within a handheld housing to sense tilt of the handheld housing about a first axis;
supplying the sensed first axis tilt to the processor;
with the processor, controlling the moving direction of the virtual object on the displayed virtual surface based on the sensed first axis tilt;
using the processor, causing said displayed virtual object to break contact with the displayed virtual surface;
using the inertial sensor disposed within the handheld housing, continually sensing tilt of the handheld housing about a second axis different from the first axis;
supplying the sensed second axis tilt to the processor;
continually changing the pitch orientation of said displayed virtual object that has broken contact with the displayed virtual surface responsively to said sensed tilt of the handheld housing about the second axis; and
controllably inclining the virtual object as the object falls through the air, and using the amount of inclination responsive to said sensed second axis tilt to affect forward velocity at which the virtual object moves forward as it falls downward.

18. The method of claim 17 wherein continually changing the orientation comprises changing at least one of pitch, yaw or roll.

19. The method of claim 17 further including the processor controlling the falling virtual object to return into contact with at least one virtual surface.

* * * * *